United States Patent
Agarwal et al.

(10) Patent No.: US 11,132,146 B2
(45) Date of Patent: Sep. 28, 2021

(54) TECHNIQUE FOR EFFICIENTLY ALLOWING SIMULTANEOUS ACCESS TO RESOURCES IN A COMPUTING SYSTEM

(71) Applicant: NVIDIA Corporation, Santa Clara, CA (US)

(72) Inventors: Kaushal Agarwal, Bangalore (IN); Alexander E. Van Brunt, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 71 days.

(21) Appl. No.: 16/425,750

(22) Filed: May 29, 2019

(65) Prior Publication Data

US 2020/0379675 A1 Dec. 3, 2020

(51) Int. Cl.
*G06F 3/00* (2006.01)
*G06F 3/06* (2006.01)
*G06F 9/455* (2018.01)

(52) U.S. Cl.
CPC .......... *G06F 3/0659* (2013.01); *G06F 3/0604* (2013.01); *G06F 3/0673* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

2007/0168641 A1\* 7/2007 Hummel ............. G06F 9/45558
                                                    711/206
2020/0193703 A1\* 6/2020 Favela .................. G06T 15/005

\* cited by examiner

*Primary Examiner* — Midys Rojas
(74) *Attorney, Agent, or Firm* — Leydig, Voit & Mayer, Ltd.

(57) ABSTRACT

Memory page table invalidations for multiple execution contexts (clients or guests) of a memory system are conventionally queued in a single physical command queue. The multiple execution contexts contend to access the queue, resulting in low performance. Instead of contending with other execution contexts to insert invalidation commands into a single physical command queue, a virtual interface and one or more virtual command queues are allocated to each guest. The execution contexts may simultaneously transmit invalidation commands for the memory system through their respective virtual interface. Additionally, each execution context may also transmit other (less often issued) commands through a hypervisor. Error handling and/or illegal access checks specific to invalidation commands that were previously performed by the hypervisor are now performed by the respective virtual interface(s).

19 Claims, 5 Drawing Sheets

TECHNIQUE FOR EFFICIENTLY ALLOWING SIMULTANEOUS ACCESS TO RESOURCES IN A COMPUTING SYSTEM

TECHNICAL FIELD

The present disclosure relates to a command queue, and more specifically to virtualization of a command queue that is accessed by multiple execution contexts.

BACKGROUND

Memory page table invalidations for multiple execution contexts (guests, clients, processes, and/or CPUs) of a memory system are conventionally queued in a single physical command queue. The multiple execution contexts contend to access the queue, resulting in low performance. Additionally, in virtualized environments implemented using a Hypervisor, the invalidation requests generated by guests must be trapped by the Hypervisor, resulting in wasted cycles at the CPU and/or delays that negatively impact performance. There is a need for addressing these issues and/or other issues associated with the prior art.

SUMMARY

Memory page table invalidations for multiple execution contexts (clients or guests) of a memory system are conventionally queued in a single physical command queue. The multiple execution contexts contend to access the queue, resulting in low performance. In virtualized environments implemented using a hypervisor, the invalidation requests generated by guests must be trapped by the hypervisor as the single physical command queue is owned by the hypervisor, resulting in delays that negatively impact performance. Instead of contending with other execution contexts to insert invalidation commands into a single physical command queue or generating requests that are trapped by the hypervisor, a virtual interface and one or more virtual command queues are allocated to each guest. The execution contexts may simultaneously transmit invalidation commands for the memory system through their respective virtual interface. Additionally, each execution context may also transmit other (less often issued) commands through the hypervisor. Error handling and/or illegal access checks specific to invalidation commands that were previously performed by the hypervisor are now performed by the respective virtual interface(s).

A method, computer readable medium, and system are disclosed for providing virtual command queues through which execution contexts access a shared physical command queue. The method provides a first execution context of a memory system with a first virtual command queue for issuing invalidation commands, each one of the invalidation commands corresponding to a portion of memory in the memory system. In an embodiment, the portion of memory is allocated to the first execution context. A first invalidation command is received at the first virtual command queue from the first execution context and is stored into the first virtual command queue. A command from the first execution context is received through the hypervisor and is stored into a shadow command queue associated with the hypervisor. A scheduler selects the command for execution by the memory system and selects the first invalidation command for execution by the memory system. The command and the first invalidation command are stored to a physical command queue.

DETAILED DESCRIPTION

Memory page table invalidations for multiple execution contexts of a memory system are conventionally queued in a single physical command queue. In the context of the following description, the term execution context can refer to a guest, client application, client, operating system (OS), thread, process, processor, interrupt context, central processing unit (CPU), or logical CPU. In the context of the following description, a thread is a virtual CPU created by an OS's abstraction. In the context of the following description, a logical CPU is perceived as a CPU by software that can be a guest OS or a native OS. The memory system may be managed by a memory management unit (MMU) included in a processor or a system MMU shared by multiple processors. The multiple clients contend to access the queue, resulting in low performance. In virtualized environments implemented using a conventional hypervisor, the invalidation requests generated by guests must be trapped by the conventional hypervisor, resulting in delays that negatively impact performance.

Instead of contending with other clients to insert invalidation commands into a single physical command queue through the hypervisor, a virtual interface and one or more virtual command queues are allocated to each client. Instead of generating requests that are trapped by the hypervisor, a virtual interface and one or more virtual command queues are allocated to each guest. The execution contexts (clients or guests) may simultaneously transmit invalidation commands for a memory system through their respective virtual interface. Additionally, each execution context may also transmit other (low frequency or less often issued) commands through the hypervisor, as is done in a conventional system for all commands. Error handling and/or illegal access checks specific to invalidation commands that were previously performed by the hypervisor are now performed by the respective virtual interface(s). The hypervisor performs error handing for the other commands that are not transmitted through the virtual interfaces.

Figure 1A:
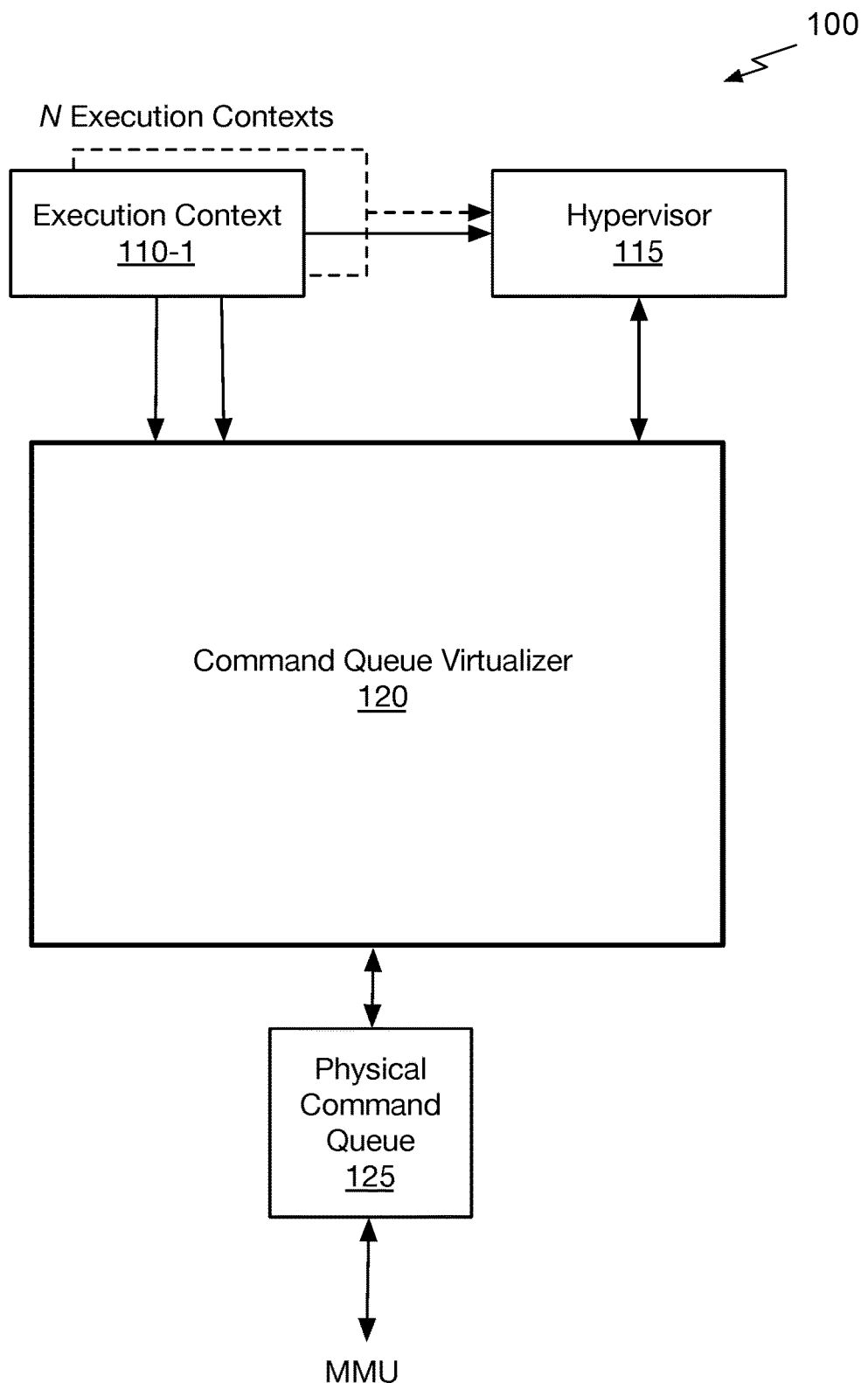
FIG. 1A illustrates a block diagram of a virtual command queue system, in accordance with an embodiment.

FIG. 1A illustrates a block diagram of a virtual command queue system 100, in accordance with an embodiment. The virtual command queue system 100 includes N execution contexts 110-1 through 110-N, a hypervisor 115, a command queue virtualizer 120, and a physical command queue 125.

In a conventional MMU system, such as an Arm® (Advanced reduced-instruction-set computing (RISC) Machine) SMMU architecture, a conventional hypervisor communicates directly with the physical command queue 125 and execution contexts issue commands only through the conventional hypervisor. In a conventional command system, there is a single communication path between the execution contexts and the physical command queue 125; in particular, all invalidation commands (e.g., commands to invalidate page table entries for memory allocated to a guest) issued by the guest are passed through the conventional hypervisor before being input to the physical command queue 125. In an embodiment, the memory is memory 304 illustrated in FIGS. 3 and 4.

In virtualized environments running multiple guest(s) managed by the hypervisor, invalidation commands for memory in a virtual space need to be sent to the MMU (SMMU). The conventional hypervisor traps the invalidation commands and sends the trapped invalidation commands to the physical command queue 125 after performing required checks for illegal accesses. The trap operation is expensive and may cost thousands of CPU cycles. In bare metal systems, when different processes/threads are running on different CPU(s) that are each trying to issue invalidation commands at the same time, a first CPU will have to wait (e.g., spinlock) to acquire a lock on the physical command queue 125 while a second CPU finishes an invalidation operation and releases the lock on the physical command queue 125. The first CPU may by occupied for many CPU cycles waiting on the lock to be released, reducing performance when other processing could have been performed.

In the virtual command queue system 100, one or more virtual command queues are allocated to each execution context 110. Each execution context 110 may issue invalidation commands to the one or more virtual command queues instead of issuing the invalidation commands through the hypervisor 115. In an embodiment, the virtual command queues are implemented in a combination of registers in the memory-mapped input/output (MMIO) space and a physical queue in memory, specifically guest dynamic random access memory (DRAM) space.

Error handling and/or illegal access checks specific for invalidation commands that are performed by the conventional hypervisor are performed by each virtual interface implemented by the command queue virtualizer 120. The communication path between the execution contexts 110 and the hypervisor 115 is maintained and is also available for execution contexts 110 to issue commands to the command queue virtualizer 120, indirectly. In an embodiment, execution contexts 110 issue low-frequency or low priority commands to the hypervisor 115. In an embodiment, multiple execution contexts 110 may issue invalidation commands simultaneously to the command queue virtualizer 120. In an embodiment, the communication path from the execution contexts 110 through the command queue virtualizer 120 to the physical command queue 125 is lower latency compared with the communication path from the execution contexts 110 through the hypervisor 115 and the command queue virtualizer 120 to the physical command queue 125.

Arbitration is performed between the invalidation commands received by the one or more virtual queues and commands received through the hypervisor to insert commands into the physical command queue 125. Rather than receiving commands only from the conventional hypervisor, the physical command queue 125 receives commands from the command queue virtualizer 120. However, in an embodiment, the hypervisor 115 interfaces with the command queue virtualizer 120 in a manner that is compatible with the conventional interface between the conventional hypervisor and the physical command queue 125.

Compared with the conventional command system, when the number of virtual command queues is greater than the number of active execution contexts 110 in the virtual command queue system 100 the execution contexts 110 do not need to obtain a lock on the physical command queue 125 and instead are able to simply issue commands to the command queue virtualizer 120. When the number of virtual command queues is not greater than the number of active execution contexts 110, the latency to obtain a lock is reduced significantly. Additionally, in the virtual command queue system 100, the invalidation commands sent directly by the guests are received by the command queue virtualizer 120, alleviating the need for the hypervisor 115 to trap each invalidation command.

Although the virtual command queue system 100 is described in the context of processing units, one or more of the units, including the N execution contexts 110-1 through 110-N, the hypervisor 115, the command queue virtualizer 120, and the physical command queue 125, may be implemented as a program, custom circuitry, or by a combination of custom circuitry and a program. For example, the command queue virtualizer 120 may be implemented by a GPU (graphics processing unit), CPU (central processing unit), or any processor capable of performing the operations of the command queue virtualizer 120. Furthermore, persons of ordinary skill in the art will understand that any system that performs the operations of the virtual command queue system 100 is within the scope and spirit of embodiments of the present disclosure.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
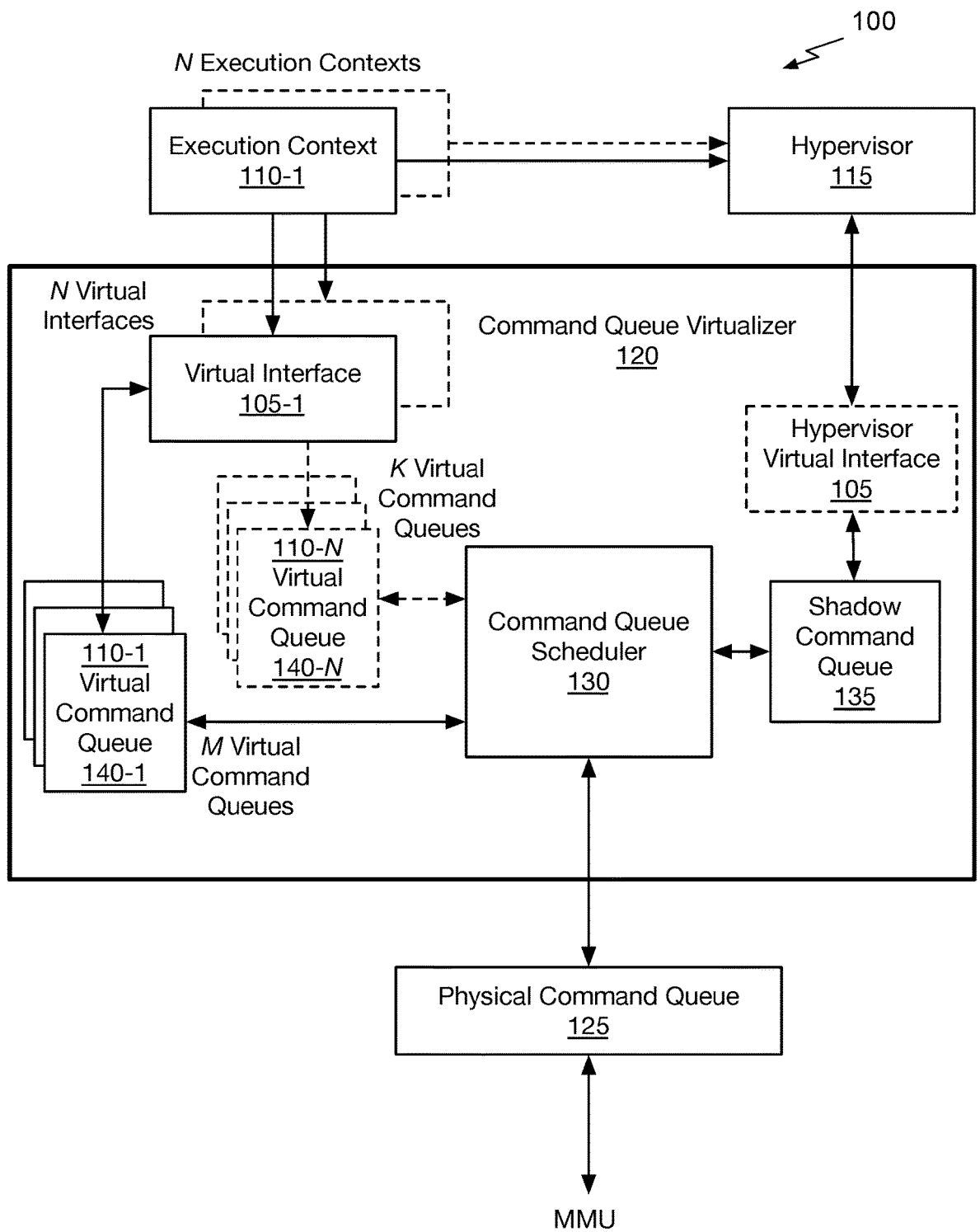
FIG. 1B illustrates a block diagram of the command queue virtualizer of FIG. 1A, in accordance with an embodiment.

FIG. 1B illustrates a block diagram of the command queue virtualizer 120 of FIG. 1A, in accordance with an embodiment. The command queue virtualizer 120 includes N virtual interfaces 105, one virtual interface for each guest 110. Each virtual interface 105 is allocated one or more virtual command queues 140. In an embodiment, the virtual command queues 140 are circular buffers. As shown in FIG. 1B, the execution context 110-1 issues commands to the virtual interface 110-1 and the virtual interface 110-1 is configured to access M virtual command queues 140-1. Similarly, an execution context 110-N issues commands to the virtual interface 105-N and the virtual interface 105-N is configured to access K virtual command queues 140-N, where M and K may be equal or different. In other words, the number of virtual command queues 140 allocated to each virtual interface 105 and/or each execution context 110 may be specified and may be different. In an embodiment, the virtual command queues 140 are not visible to the respective execution contexts 110, directly, but instead are accessed via the virtual interface 105 allocated to the respective execution contexts 110. The command queue virtualizer 120 also includes a command queue scheduler 130 and a shadow command queue 135. In an embodiment, the hypervisor 115 is configured to communicate with the shadow command queue 135 through a hypervisor virtual interface 105.

In an embodiment, each execution context 110 is a virtual machine in a virtualized environment that is assigned a virtual interface 105. In the context of the following description, the execution context 110-1, virtual interface 105-1, and virtual command queues 140-1 are used an example to describe functions performed by any of the execution contexts 110, virtual interfaces 105, and virtual command queues 140, respectively. In an embodiment, the hypervisor 115 programs the virtual interface 105-1 for the virtual machine identifier (VMID) of the execution context 110-1 (a virtual machine) and the execution context ID for the physical and/or virtual device(s) that are assigned to the execution context 110-1. The hypervisor 115 then allocates M virtual command queues 140 to the virtual interface 105-1 from a pool of available command queues 140.

When a command is received by the virtual interface 105-1, the virtual interface 105-1 checks if the virtual command queue 140 being accessed by the execution context 110-1 is allocated to the execution context 110-1 so a rogue execution context 140 cannot pollute virtual command queues 140 that are allocated to a different execution context 110. When an invalidation command is received by the virtual interface 105-1, the virtual interface 105-1 checks if the invalidation command specifies the correct VMID or the StreamID for the execution context 110 and if the invalidation command is a legal command. A StreamID may point to a physical device which is assigned to a virtual machine or to a virtual device assigned to the virtual machine. An execution context should only be allowed to send Invalidation commands to the physical or virtual devices (indicated by the StreamID) assigned to the execution context. The virtual interface 105-1 only allows commands that pass the checks to be dispatched to the command queue scheduler 130 for processing. In an embodiment, a virtual StreamID may be mapped to a physical StreamID if required by the hypervisor 115 by using StreamID checking/mapping controls.

When a command fails the checks performed by the virtual interface 105, the virtual interface 105 will stop processing any further commands and set an error status flag. In an embodiment, when the hypervisor 115 defines a virtual interface 105 for its own use, the virtual interface 105 is configured with checking disabled as the checking is performed by the hypervisor 115 prior to forwarding the invalidation request to the virtual interface 105.

Each virtual interface 105 is configured by the hypervisor 115 to interface between the execution context 110 and the one or more virtual command queues 140 allocated to the execution context 110 in memory. The virtual interface 105 for an execution context 110 provides a consumer index and a producer index for each one of the virtual command queues 140 allocated to the execution context 110. In an embodiment, the producer index and the consumer index are in address space allocated to the virtual command queues 140. In an embodiment, the producer index is provided in the register space, the consumer index is provided in DRAM (cacheable), and the queue where the actual commands are written is provided in the memory. A CPU execution context 110 may be woken up when the consumer index is updated and therefore polling the consumer index is not necessary.

The producer index for the virtual command queue 140 is incremented when a command is enqueued and the consumer index is incremented when a command is executed. For example, when an invalidation command is written to the virtual command queue 140-1 by the execution context 110-1, the execution context 110-1 increments the producer index for the virtual command queue 140-1 through the virtual interface 105-1. When the invalidation command is executed by the MMU, the MMU updates a consumer index for the physical command queue 125 and the command queue scheduler 130 increments the consumer index for the virtual command queue 140-1. In an embodiment, the execution context 110-1 polls for invalidation command execution done using "wait-for-event" (WFE) for the consumer index update when the consumer index is stored in its own cache line in DRAM.

Whenever one or more command(s) are enqueued into the virtual command queue 140 allocated to an execution context 110, the virtual interface 105 fetches the command(s) from the DRAM and dispatches the command(s) to the command queue scheduler 130. In an embodiment, each command is resident into a separate cache line of the DRAM, irrespective of the size of the command, and the virtual interface 105 fetches the command(s) from the virtual command queue 140 in DRAM.

The command queue scheduler 130 arbitrates between the virtual command queues 140 and the shadow command queue 135. The shadow command queue 135 receives commands from the hypervisor 115, providing a path between the hypervisor 115 and the physical command queue 125. The command queue scheduler 130 transfers selected invalidation commands from the virtual command queue s 140 and selected commands from the shadow command queue 135 to the single, shared physical command queue 125. In an embodiment, the command queue scheduler 130 uses a hierarchical weighted round robin (WRR) arbitration policy to provide fairness to each virtual interface 105 and the virtual command queues 140. In an embodiment, the command queue scheduler 130 ensures that not more than a predetermined number of commands from a single virtual interface 105 are pipelined for processing at a given time to ensure protection against denial-of-service (DOS) attacks from a given virtual machine, execution context 110. In an embodiment, the command queue scheduler 130 checks which of the virtual interfaces 105 have commands ready to be scheduled (e.g., stored in at least one virtual command queue 140) and selects a particular virtual interface 105 for operation only if the particular virtual interface 105 does not have more than the predetermined number of commands already in flight for processing.

In an embodiment, the shadow command queue 135 is a circular buffer allocated in the memory. The shadow command queue 135 is associated with a dedicated shadow producer index and a dedicated shadow consumer index for tracking command execution and fullness of the queue. In an embodiment, the shadow producer index is provided in the register space and the queue where the actual commands are written is provided in the memory.

The command queue scheduler 130 arbitrates between the different virtual command queue s 140 and the shadow command queue 135 to insert commands into the physical command queue 125 for execution by the MMU. The command queue scheduler 130 updates a dedicated physical producer index when invalidation commands are inserted into the physical command queue 125 and receives updates to a dedicated physical consumer index from the MMU when the commands are executed. The command queue scheduler 130 passes updates to the physical consumer index to the corresponding virtual interface 105 or shadow command queue 135 for each invalidation command executed by the MMU. In contrast with a conventional system, where only the conventional hypervisor can write the physical command queue 125, in the virtual command queue system 100, any of the execution contexts 110 can also write the physical command queue 125 without communicating with the hypervisor 115.

Figure 1C:
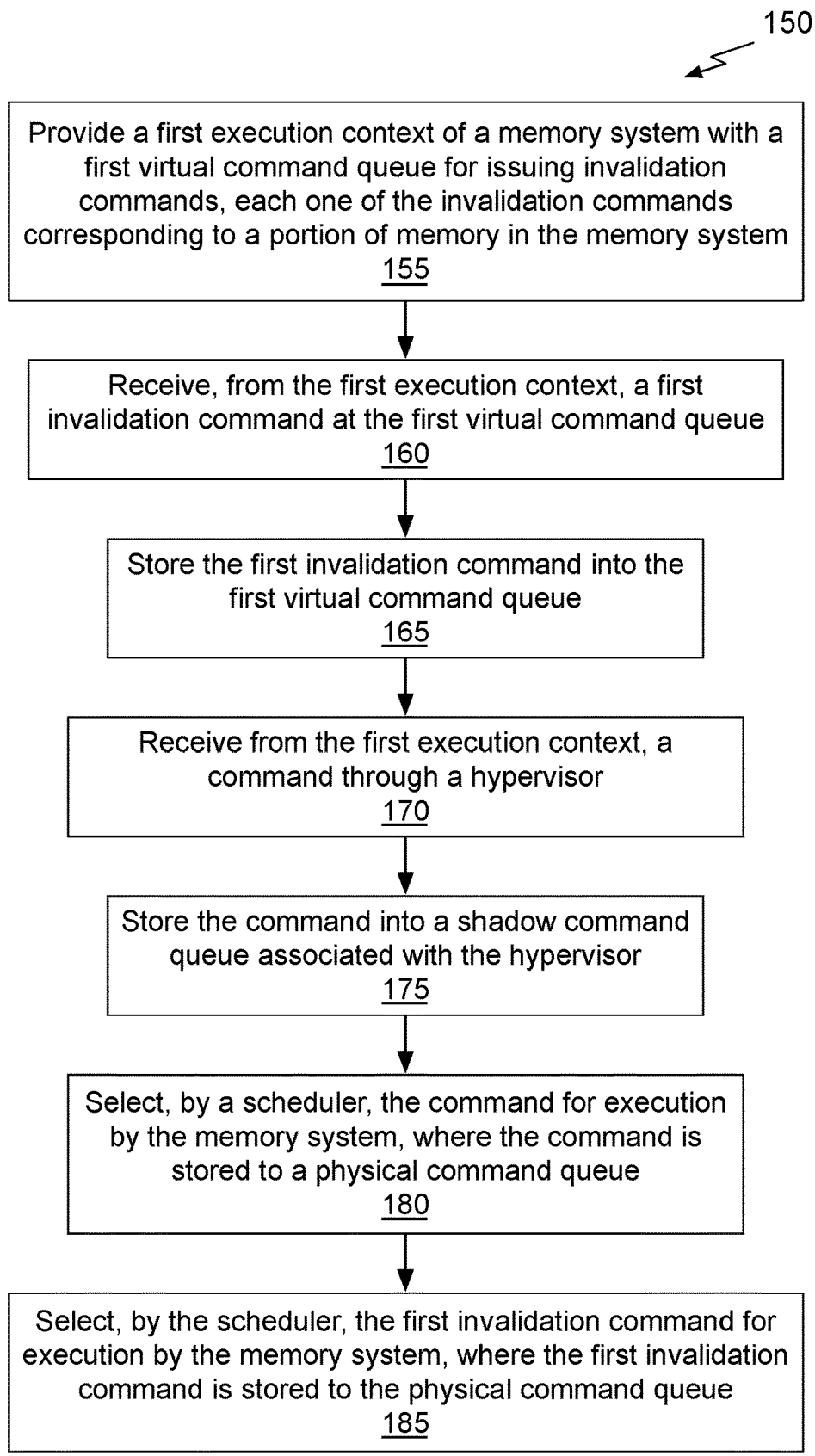
FIG. 1C illustrates a flowchart of a method for implementing a command queue virtualizer, in accordance with an embodiment.

FIG. 1C illustrates a flowchart of a method 150 for implementing a command queue virtualizer 120, in accordance with an embodiment. Although method 150 is described in the context of a processing unit, the method 150 may also be performed by a program, custom circuitry, or by a combination of custom circuitry and a program. For example, the method 150 may be executed by a GPU (graphics processing unit), CPU (central processing unit), or any processor capable of performing the operations of the command queue virtualizer 120. Furthermore, persons of ordinary skill in the art will understand that any system that performs method 150 is within the scope and spirit of embodiments of the present disclosure.

At step 155, a first execution context 110-1 of a memory system is provided with a first virtual command queue 140-1 for issuing invalidation commands, each one of the invalidation commands corresponding to a portion of memory in the memory system. In an embodiment, the portion of memory is allocated to the first execution context 110-1. In an embodiment, the invalidation commands corresponding to the portion of memory are configured to invalidate page table entry for the portion of memory.

At step 160, a first invalidation command is received at the first virtual command queue 140-1 from the first execution context 110-1. In an embodiment, a second execution context 110-2 of the memory system is provided with a second virtual command queue 140-2 for issuing invalidation commands for portions of the memory in the memory system that are allocated to the second execution context 110-2. In an embodiment, simultaneous with receiving the first invalidation command from the first execution context 110-1, a second invalidation command is received at the second virtual command queue 140-2 from the second execution context 110-2.

At step 165, the first invalidation command is stored into the first virtual command queue 140-1. In an embodiment, the first invalidation command is stored in a separate cache line within the first virtual command queue 140-1 compared with other invalidation commands stored in the first virtual command queue 140-1. Storing each command in a separate cache line within the first virtual command queue 140-1 enables multiple CPU execution contexts 110 to access the command queue 140-1 when the number of virtual command queue(s) 105 that are supported is less than the number of CPU execution contexts 110.

In an embodiment, after storing the first invalidation command to the first virtual command queue 140-1, the first execution context 110-1 updates a producer index for the first virtual command queue 140-1. In an embodiment, the producer index is stored in a cache line, separate from producer indices corresponding to other virtual command queues 140. In an embodiment, the producer index is stored in a register that can be accessed by the command queue scheduler 130. In an embodiment, the register is in MMIO address space and is written via an uncached write. In an embodiment, a consumer index corresponding to the first virtual command queue 140-1 is updated in response to execution of the first invalidation command. In an embodiment, the consumer index is stored in a cache line, separate from consumer indices corresponding to other virtual command queues 140. In an embodiment, the first execution context 110-1 waits for the consumer index to be updated before continuing processing. The command queue scheduler 130 tracks commands that are dispatched to the physical command queue 125 and, when the MMU updates a consumer index, the command queue scheduler 130 updates the consumer index for the virtual command queue 140 that provided the command.

At step 170, a command from the first execution context 110-1 is received through the hypervisor 115. At step 175, the command is stored into a shadow command queue 135 associated with the hypervisor 115. At step 180, the command queue scheduler 130 selects the command for execution by the memory system and the command is stored to the physical command queue 125. At step 185, the command queue scheduler 130 selects the first invalidation command for execution by the memory system and the first invalidation command is stored to the physical command queue 125.

The first execution context 110-1 may use either a hardware accelerated communication path through the first virtual command queue 140-1 or a unaccelerated path through the hypervisor 115 to issue a command, where the command may be an invalidation command. Additionally, multiple execution contexts 110 may simultaneously issue commands through corresponding virtual command queues 140 and a single execution context 110 may simultaneously issue commands to one or more of the virtual command queues 140 allocated to the single execution context 110.

The virtual interfaces 105 may be configured to perform checks to ensure a rogue virtual machine is not sending illegal commands or attempting a DOS attack. The checks may also ensure a rogue virtual machine cannot invalidate contexts owned by other virtual machines. In an embodiment, the virtual interfaces 105 are implemented in circuitry and the checks are performed by the circuitry. Each virtual interface 105 provides a controlling window through which access to the virtual command queues 140 and physical command queue 125 by the execution contexts 110 are restricted.

Figure 2:
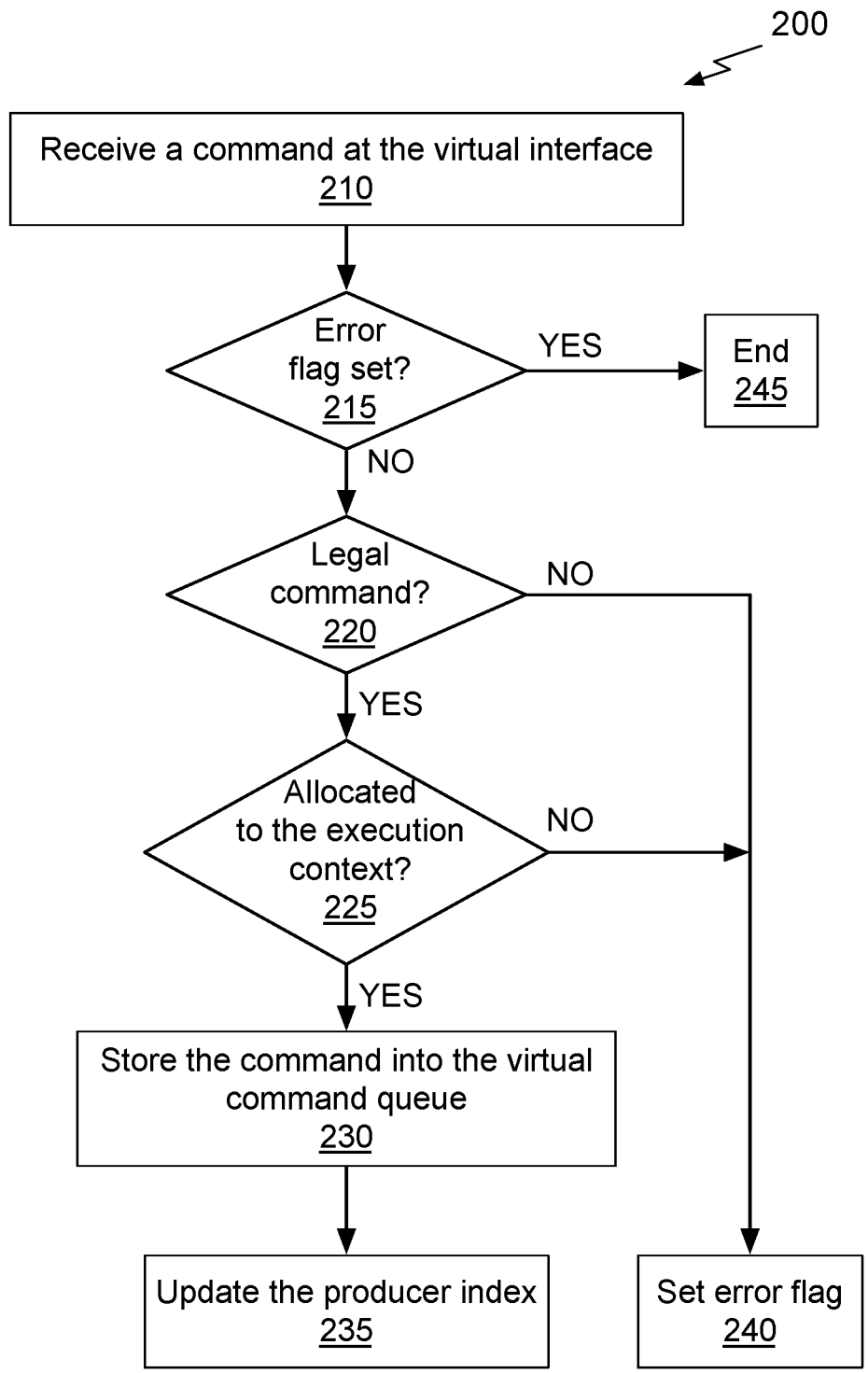
FIG. 2 illustrates a flowchart of a method for receiving commands at a virtual interface, in accordance with an embodiment.

FIG. 2 illustrates a flowchart of a method 200 for receiving commands at a virtual interface 105, in accordance with an embodiment. Although method 200 is described in the context of a processing unit, the method 200 may also be performed by a program, custom circuitry, or by a combination of custom circuitry and a program. For example, the method 200 may be executed by a GPU (graphics processing unit), CPU (central processing unit), or any processor capable of performing the operations of the virtual interface 105. Furthermore, persons of ordinary skill in the art will understand that any system that performs method 200 is within the scope and spirit of embodiments of the present disclosure.

At step 210, a command is received at the virtual interface 105-1. In an embodiment, the command is an invalidation command. At step 215, the virtual interface 105-1 determines if an error flag is set for the virtual interface 105-1. In an embodiment, when the error flag is set for a particular virtual interface 105, the virtual interface 105 is disbanded and any further processing of the commands issued by the virtual interface 105 is stopped.

At step 220, the virtual interface 105-1 determines if the command is legal. In an embodiment, the hypervisor 115 configures the virtual interfaces 105 to handle a first set of commands issued by the execution contexts 110 and the hypervisor 115 handles a second set of commands issued by the execution contexts 110, where a particular command is in either the first set or the second set, but not in both sets. Defining first and second sets of commands ensures a minimum command workload is offloaded from the hypervisor 115 to the command queue virtualizer 120.

In an embodiment, the first set of commands includes the invalidation command and, at step 220, when the command is an invalidation command, the virtual interface 105-1 determines that the command is legal and proceeds to step 225. In an embodiment, the second set of commands includes an invalidate stream table entry (STE) command because the command impacts the execution context 110 targeted by the command. In an embodiment, the second set of commands includes the invalidation stream table entry command and, at step 220, when the command is an invalidation stream table entry command, the virtual interface 105-1 determines that the command is not legal and proceeds to step 245 and ends processing of the command. In an embodiment, when the error flag is set, the command is discarded. In an embodiment, when the error flag is set, the first virtual command queue 140-1 is flushed. In an embodiment, when the error flag is set for a particular virtual interface 105, the virtual interface 105 is disbanded and any further processing of the commands issued by the virtual interface 105 is stopped.

At step 225, the virtual interface 105-1 determines that the command is an invalidation command for a portion of the memory that is not allocated to the execution context 110-1 and proceeds to step 240. Otherwise, when the virtual interface 105-1 determines that the command is an invalidation command within the portion of the memory that is allocated to the execution context 110-1, the virtual interface 105-1 proceeds to step 230. In an embodiment, the hypervisor 115 defines a memory map to ensure isolation among the execution contexts 110. In an embodiment, configurations for the virtual command queue 120 are part of a separate page of memory which is mapped only at the hypervisor 115 and registers allocated for the virtual command queues 140 are part of a different page for each virtual interface 105.

At step 230, the virtual interface 105-1 stores the command into the virtual command queue 140-1. At step 235, virtual interface 105-1 updates the producer index for the virtual command queue 140-1. In an embodiment, after updating the producer index, the execution context 110-1 waits for the command to be completed by polling the consumer index, until the consumer index is updated. During the polling, the execution context 110-1 may continue to write commands to other virtual command queues 140 or to the same virtual command queue 140. In an embodiment, a thread executing on a CPU execution context 110-1 obtains exclusive permission for accessing (e.g. locks) the consumer index location and execute a WFE on the CPU execution context 110-1. The CPU execution context 110-1 is put into a sleep state and is woken up when the consumer index location is updated, for example when the MMU updates the consumer index.

In summary, each execution context 110 may issue page table invalidation commands through a dedicated virtual interface 105 and one or more virtual command queues 140 and also issue non-accelerated/infrequent commands to the hypervisor 115. The virtual interfaces 105 enable multiple guest execution contexts to queue invalidation commands in parallel without needing to be trapped by the hypervisor 115. As in conventional systems, the hypervisor can queue requests on the physical command queue 125. However, instead of directly accessing the physical command queue 125, the hypervisor 115 accesses the physical command queue 125 by routing requests through the shadow command queue 135. Importantly, the virtual interface 105 for each execution context 110 performs error checks and/or illegal access checks on each command enqueued through the virtual command queues 140 assigned to the execution context 110 and, when an error is found, the virtual interface 105 associated with the virtual command queue 140 containing the error is disbanded. The command queue scheduler 130 selects commands from the shadow command queue 135 and the virtual command queues 140 for output to a physical command queue and performs the queue management operations for the physical command queue 125 and the virtual command queue(s) (producer and consumer index updates).

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 3:
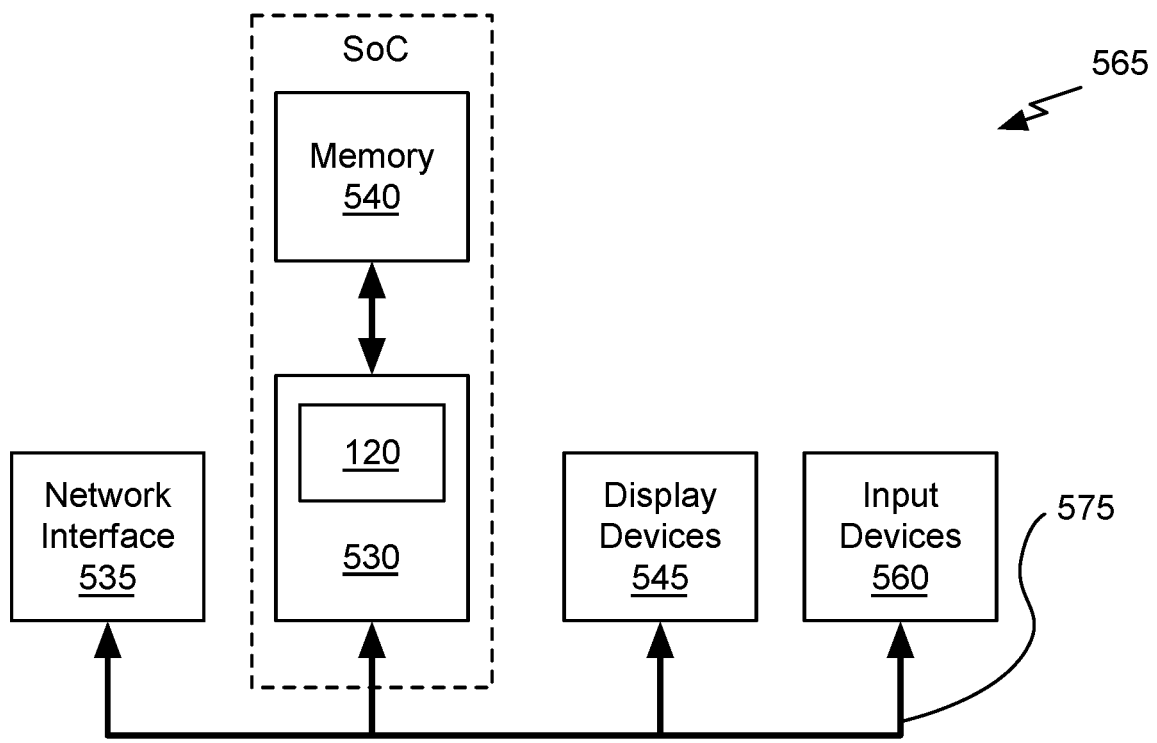
FIG. 3 illustrates an exemplary system in which the various architecture and/or functionality of the various previous embodiments may be implemented.

FIG. 3 illustrates an exemplary system 565 in which the various architecture and/or functionality of the various previous embodiments may be implemented. The exemplary system 565 may be configured to implement the method 150 shown in FIG. 1C and the method 200 shown in FIG. 2. The exemplary system 565 may be implemented using one or more single semiconductor platforms. In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the exemplary system 565 may be implemented as a circuit board substrate and each of the processors 530 and/or memories 540 may be packaged devices. As shown, a system 565 is provided including at least one processor (CPU or GPU) 530 that is connected to a communication bus 575. The communication bus 575 may be implemented using any suitable protocol, such as high-speed NVLink, PCI (Peripheral Component Interconnect), PCI-Express, AGP (Accelerated Graphics Port), Hyper-Transport, or any other bus or point-to-point communication protocol(s). The system 565 also includes a main memory 540. As shown in FIG. 3, the memory 540 and processor 530 are implemented as a system-on-a-chip (SoC).

In an embodiment, the processor 530 is configured to implement a graphics rendering pipeline for processing three-dimensional (3D) graphics data in order to generate two-dimensional (2D) image data for display on a display device such as a liquid crystal display (LCD) device. In other embodiments, the processor 530 may be utilized for performing general-purpose computations.

One or more processors 530 may be configured to accelerate thousands of High Performance Computing (HPC), data center, and machine learning applications. The processor 530 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

The processor 530 may include one or more MMUs that may each include one or more command queue virtualizers 120. The memory 540 may include a number of memory devices. Control logic (software) and data are stored in the main memory 540 which may take the form of random access memory (RAM). In an embodiment, the memory 540 may comprise a number of dynamic random access memory (DRAM) devices. The DRAM devices may be configured as a high-bandwidth memory (HBM) subsystem, with multiple DRAM dies stacked within each device.

The memory 540 may be implemented using memory devices such as high bandwidth memory stacks or graphics double-data-rate, version 5, synchronous dynamic random access memory, or other types of persistent storage. In an embodiment, the memory 540 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where the processor(s) 530 process very large datasets and/or run applications for extended periods.

The system 565 also includes input devices 560 and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A method, comprising:
providing a first execution context of a memory system with a first virtual command queue for issuing invalidation commands, each one of the invalidation commands corresponding to a portion of memory in the memory system that is allocated to the first execution context;
receiving, from the first execution context, a first invalidation command at the first virtual command queue;
storing the first invalidation command into the first virtual command queue;
receiving, from the first execution context, a command through a hypervisor;
storing the command into a command queue associated with the hypervisor;
selecting from the command queue, by a scheduler, the command for execution by the memory system, wherein the command is stored to a physical command queue that is shared by multiple execution contexts including the first execution context; and
selecting from the first virtual command queue, by the scheduler, the first invalidation command for execution by the memory system, wherein the first invalidation command is stored to the physical command queue.

2. The method of claim 1, wherein the invalidation commands corresponding to the portion of memory are configured to invalidate a page table entry for the portion of memory.

3. The method of claim 1, further comprising:
providing a second execution context of the memory system with a second virtual command queue for issuing invalidation commands for portions of the memory in the memory system that are allocated to the second execution context; and
receiving, simultaneous with receiving the first invalidation command from the first execution context, a second invalidation command at the second virtual command queue from the second execution context.

4. The method of claim 1, further comprising:
receiving, from the first execution context, a second command;
determining that the second command is an illegal command; and
discarding the second command.

5. The method of claim 1, further comprising:
receiving, from the first execution context, a second invalidation command;
determining that the second invalidation command specifies a second portion of the memory in the memory system that is allocated to a second execution context; and
discarding the second invalidation command.

6. The method of claim 1, further comprising, after storing the first invalidation command to the first virtual command queue, the first execution context indicates to the scheduler that the first invalidation command is ready for selection by updating a producer index for the first virtual command.

7. The method of claim 6, wherein the producer index is stored in a cache line, separate from producer indices corresponding to other virtual command queues.

8. The method of claim 7, wherein the producer index is also stored in a register that can be accessed by the scheduler.

9. The method of claim 1, further comprising, in response to an update to a first consumer index corresponding to the physical command queue indicating that the first invalidation command was executed, updating a second consumer index corresponding to the first virtual command queue by the scheduler to indicate to the first execution context that the first invalidation command was executed.

10. The method of claim 9, wherein the second consumer index is stored in a cache line, separate from consumer indices corresponding to other virtual command queues.

11. The method of claim 9, wherein the first execution context waits for the second consumer index to be updated before continuing processing.

12. The method of claim 1, wherein the first invalidation command is stored in a cache line within the first virtual command queue, separate from other invalidation commands stored in the first virtual command queue.

13. A system, comprising:
a memory storage comprising a first virtual command queue, a command queue associated with a hypervisor, and a physical command queue that is shared by multiple execution contexts including a first execution context;
a processor configured to execute instructions that implement at least a portion of a command queue virtualizer configured to:
provide the first execution context of a memory system with the first virtual command queue for issuing invalidation commands, each one of the invalidation commands corresponding to a portion of the memory storage that is allocated to the first execution context;
receive, from the first execution context, a first invalidation command at the first virtual command queue;
store the first invalidation command into the first virtual command queue;
receive, from the first execution context, a command through the hypervisor;
store the command into the command queue associated with the hypervisor;
select from the command queue, by a scheduler, the command for execution by the memory system, wherein the command is stored to the physical command queue; and
select, by the scheduler, the first invalidation command for execution by the memory system, wherein the first invalidation command is stored to the physical command queue.

14. The system of claim 13, wherein the invalidation commands corresponding to the portion of memory are configured to invalidate a page table entry for the portion of memory.

15. The system of claim 13, wherein the command queue virtualizer is further configured to:
provide a second execution context of the memory system with a second virtual command queue for issuing invalidation commands for portions of the memory in the memory system that are allocated to the second execution context; and receive, simultaneous with receiving the first invalidation command from the first execution context, a second invalidation command at the second virtual command queue from the second execution context.

16. The system of claim 13, wherein the command queue virtualizer is further configured to:
receive, from the first execution context, a second command;
determine that the second command is an illegal command; and
discard the second command.

17. The system of claim 13, wherein the command queue virtualizer is further configured to:
receive, from the first execution context, a second invalidation command;
determine that the second invalidation command specifies a second portion of the memory in the memory system that is allocated to a second execution context; and
discard the second invalidation command.

18. The system of claim 13, wherein the command queue virtualizer is further configured to, after storing the first invalidation command to the first virtual command queue, indicate to the scheduler that the first invalidation command is ready for selection by updating a producer index for the first virtual command.

19. A non-transitory computer-readable media storing computer instructions that, when executed by one or more processors, cause the one or more processors to perform the steps of:
providing a first execution context of a memory system with a first virtual command queue for issuing invalidation commands, each one of the invalidation commands corresponding to a portion of memory in the memory system that is allocated to the first execution context;
receiving, from the first execution context, a first invalidation command at the first virtual command queue;
storing the first invalidation command into the first virtual command queue;
receiving, from the first execution context, a command through a hypervisor;
storing the command into a command queue associated with the hypervisor;
selecting from the command queue, by a scheduler, the command for execution by the memory system, wherein the command is stored to a physical command queue that is shared by multiple execution contexts including the first execution context; and
selecting from the first virtual command queue, by the scheduler, the first invalidation command for execution by the memory system, wherein the first invalidation command is stored to the physical command queue.

* * * * *